Patented Nov. 15, 1938

2,136,453

UNITED STATES PATENT OFFICE 2,136,453

PROCESS FOR OBTAINING A VITAMIN PREPARATION

Harvey M. Merker, Detroit, Mich., assignor to Parke, Davis & Company, Detroit, Mich., a corporation of Michigan No Drawing. Application May 22, 1933, Serial No. 672,356

3 Claims. (Cl. 87—6)

The invention relates to a process for obtaining a therapeutic product from fish livers and the like and particularly useful for its vitamin A content.

One of the primary objects of this invention is to provide a product possessing a substantially higher vitamin A content than good medicinal cod liver oil. Another object is to provide such a product in the form of a stable, palatable and efficacious liquid product substantially free from disagreeable taste, odor, discoloring, and substantially free from many objectionable impurities such as fatty acids and nitrogenous bodies.

A further object is to make available as a commercial commodity a liquid vitamin preparation of such potency as to be effective in dosages measured in drops rather than in the standards such as teaspoonfuls commonly used heretofore.

The invention is more particularly concerned with a process for obtaining product derived from the livers of halibut (hippoglossus) though it is also useful for extracting oils from other fish livers such as the tuna, ling cod, sable cod, etc.

My invention has made available as a commercial product a liquid vitamin preparation containing vitamin A averaging not less than 32,000 U. S. P. X. units per gram of oil and vitamin D not less than 2,000 A. D. M. A. units per gram. The product is light in color and substantially free from disagreeable odor or taste. It contains less than one per cent of free fatty acids and less than one-tenth of one per cent of nitrogenous material. Due to its purity and potency it may be taken orally with less disagreeable reactions than with any liquid vitamin A preparations heretofore available.

One method of obtaining halibut liver oil having the characteristics hereinbefore pointed out is as follows: The fresh halibut livers are first cooked by placing them in a suitable container and passing live steam through the same until the temperature reaches 85° C. The cooking is preferably carried out for thirty minutes or more, in which time the enzymes are killed and the proteins coagulated. The mass is then placed on a strainer and the excess water allowed to drain out. The residue from the cooking is then extracted with a suitable solvent such as ether, it being preferable to successively extract the mass several times, combining the extracts. In order to remove the moisture in the extract, finely powdered anhydrous sodium sulphate is added gradually while stirring, using approximately 3 pounds per gallon of extract. The mixture is allowed to stand several hours after which time the water is completely removed from the solution. The supernatant oil solution is then percolated slowly through a column of synthetic sodium aluminum silicate (permutit) having the formula $$Na_2Al_2H_6Si_2O_8$$ 

The proportion used is preferably one pound of the silicate to the equivalent volume of ether extract containing one pound of oil. This step removes the dark color from the ether extract and at the same time removes part of the free fatty acid content. The ether is next removed by distillation, but it is not ordinarily possible to remove the ether completely by this process. Therefore, after ninety-five per cent of the ether is removed in the still, the solution is then allowed to trickle over heated coils, thereby removing the last traces of the ether. The resulting oil has a golden yellow to amber color, carries very little of the fishy taste and odor, has a reduced content of fatty acids and is relatively stable to heat in the sense that it will not darken in color. The oil has a vitamin A potency of well over 32,000 U. S. P. X. units per gram of oil and also contains over 2,000 A. D. M. A. vitamin D.

With the process as above described, I have obtained a new vitamin product which is of great utility. The product in the form of a liquid is highly potent since it contains not less than 32,000 U. S. P. X. vitamin A units per gram of oil as compared with standard cod liver oil which has but 400 such units per gram, and 2,000 A. D. M. A. vitamin D units per gram as compared with standard cod liver oil which has 100 such units per gram.

The new product is golden yellow to amber in color and contains very little fishy odor or taste. The free fatty acid content is less than one per cent and the nitrogen content is less than one-tenth of one per cent. Thus the product is ideally adapted for oral administration and is of such high potency that a sufficient daily dose for ordinary purposes amounts to but a few drops of the liquid. The product contains both vitamins A and D although the vitamin A content is much greater in proportion than the vitamin D. While I have indicated before that the vitamin A potency averages not less than 32,000 U. S. P. X. units per gram, it should also be noted that this potency is often times much higher and in some cases may be as high as 300,000 units per gram. On the other hand, the vitamin D potency does not increase at the same rate as the A and does not ordinarily exceed 6,000 A. D. M. A. units per gram.

Where a vitamin preparation is desired containing not only high vitamin A potency, but also high vitamin D potency, this can be obtained by adding to the halibut liver oil sufficient irradiated ergosterol to bring the vitamin D potency to the desired standard.

What I claim as my invention is:

1. The process of obtaining a therapeutic product of high vitamin value comprising cooking halibut livers at a temperature up to 85° C., removing excess water, extracting the cooked liver residue with ether, adding anhydrous sodium sulphate to said extract to remove moisture therefrom, percolating said extract through permutit and removing the ether thereby leaving a golden yellow to amber oil having a vitamin A potency not less than 32,000 U. S. P. X. units per gram of oil and having not less than 2,000 A. D. M. A. vitamin D units per gram of oil, said oil having a free fatty acid content of less than 1%, a nitrogen content of less than $\frac{1}{10}$ of 1% and containing substantial amounts of saponifiable oil.

2. The process of obtaining a therapeutic product of high vitamin value comprising treating an ether extract of halibut livers with sodium aluminum silicate thereby removing impurities from said ether extract without removing the vitamin content, and removing the ether from said extract thereby obtaining halibut liver oil having a vitamin A potency not less than 32,000 U. S. P. X. units per gram of oil, having a vitamin D potency not less than 2,000 A. D. M. A. vitamin D units per gram of oil, having a free fatty acid content of less than 1%, a nitrogen content of less than $\frac{1}{10}$ of 1% and being a light colored golden yellow to amber liquid containing substantial amounts of saponifiable oil.

3. The process of obtaining a therapeutic product of high vitamin value comprising treating an ether extract of fish livers and the like with sodium aluminum silicate, thereby removing impurities from said ether extract without removing the vitamin content, and removing the ether from said extract, thereby obtaining an oil having high vitamin potency.

HARVEY M. MERKER.